United States Patent
Furlani et al.

[11] Patent Number: 6,071,752
[45] Date of Patent: Jun. 6, 2000

[54] METHOD OF MAKING A LIGHT REFLECTOR

[75] Inventors: Edward P. Furlani, Lancaster; William J. Grande, Pittsford; Syamal K. Ghosh, Rochester, all of N.Y.

[73] Assignee: Eastman Kodak Company, Rochester, N.Y.

[21] Appl. No.: 09/179,503

[22] Filed: Oct. 27, 1998

Related U.S. Application Data

[63] Continuation of application No. 08/752,134, Nov. 21, 1996, Pat. No. 5,898,515.

[51] Int. Cl.⁷ .................................................. H01L 21/00
[52] U.S. Cl. .............................. 438/52; 438/72; 359/290; 257/659
[58] Field of Search .................................. 438/3, 19, 48, 438/50, 953, 57, 72, 73, 78, 52; 257/659, 428, 415, 431, 437, 421; 359/291, 290, 846

[56] References Cited

U.S. PATENT DOCUMENTS

| | | | |
|---|---|---|---|
| 4,662,746 | 5/1987 | Hornbeck | 359/223 |
| 4,783,237 | 11/1988 | Aine et al. | 438/52 |
| 5,408,253 | 4/1995 | Iddan | 347/260 |
| 5,465,046 | 11/1995 | Campbell et al. | 324/244 |
| 5,536,963 | 7/1996 | Polla | 257/417 |
| 5,587,343 | 12/1996 | Kano et al. | 438/52 |
| 5,663,830 | 9/1997 | Ji et al. | 359/295 |
| 5,673,139 | 9/1997 | Johnson | 359/291 |
| 5,677,783 | 10/1997 | Bloom et al. | 359/224 |
| 5,710,657 | 1/1998 | Um | 359/295 |
| 5,760,947 | 6/1998 | Kim et al. | 359/291 |
| 5,793,519 | 8/1998 | Furlani et al. | 359/291 |
| 5,898,515 | 4/1999 | Furlani et al. | 359/290 |
| 5,910,856 | 6/1999 | Ghosh et al. | 359/291 |
| 5,914,507 | 6/1999 | Polla et al. | 257/254 |

*Primary Examiner*—John F. Niebling
*Assistant Examiner*—Christopher Lattin
*Attorney, Agent, or Firm*—Clyde E. Bailey, Sr.

[57] ABSTRACT

An improved microminiature radiation reflector is formed in a silicon support body with a fabricated cantilever member extending over a cavity that has been etched in the support body. The cantilever member has a reflection surface for reflecting incident radiation to a first position when the cantilever member is not deflected. An electromagnet is formed in the silicon support body adjacent the free end of the cantilever member for deflecting the cantilever member into the cavity of the support body so as to cause incident radiation to be reflected to a second position. An array of radiation reflectors is also disclosed for forming images from electrical signals applied to the electromagnets of selected ones of the radiation reflectors as a function of the position of their reflected radiation in the to be formed image.

6 Claims, 6 Drawing Sheets

METHOD OF MAKING A LIGHT REFLECTOR

CROSS REFERENCE TO RELATED APPLICATIONS

This invention is a Continuing application of Ser. No. 08/752,134, now U.S. Pat. No. 5,898,515 filed Nov. 21, 1996.

FIELD OF THE INVENTION

This invention relates generally to the field of radiation reflectors and more particularly to a miniature electromagnetically driven radiation (light) reflector that is fabricated on a silicon substrate.

BACKGROUND OF THE INVENTION

Conventional electromagnetic radiation (light) reflectors consist of flexible members that move relative to an incident light beam to reflect the incident light at a predefined angle. For magnetically based devices, the movement of the reflector is usually due to the interactions of energized coils with permanent magnets arranged in proximity to one another. These conventional reflectors are relatively large (1 cubic cm) and tend to require labor intensive assembly. The subject of this disclosure is a novel integrated micro-electromagnetic light reflector. This reflector comprises a cantilever, activation current trace, flux focusing member, and integrated control circuitry to control the current to the activation trace. The cantilever further comprises a silicon nitride base which is coated with a hard magnetic material that is polarized along its length. The magnetic material is itself coated with a thin metallic layer for reflecting incident light. This device lends itself to automated mass fabrication thereby reducing per unit cost with improved reliability. Moreover, it enables a reduction in size (less than 1 cubic mm) and can be fully integrated with drive electronics etc., all on the same substrate. This makes it ideal for applications such as digital display and printing devices.

SUMMARY OF THE INVENTION

The present invention is directed to overcoming one or more of the problems set forth above. Briefly summarized, according to one aspect of the present invention there is provided a radiation reflector comprised of:

a support body having a recess formed therein;

a cantilever member mounted to said support body for deflection into said recess;

radiation reflection means integral with said cantilever member for reflecting incident radiation to a first position when the cantilever member is not deflected;

a poled magnet mounted on said cantilever member; and electromagnet means integral with said support body for deflecting said cantilever member to reflect incident radiation to a second position by interacting with said poled magnet.

A miniature electromagnetic light reflector fabricated on a silicon substrate is disclosed. The substrate comprises a cantilever, activation current trace, flux focusing member, and integrated control circuitry to control the current to the activation trace. The cantilever is formed from a silicon nitride base which is coated with a hard magnetic material that is polarized along its length. The magnetic material is itself coated with a thin metallic layer for reflecting incident light.

These and other aspects, objects, features, and advantages of the present invention will be more clearly understood and appreciated from a review of the following detailed description of the preferred embodiments and appended claims, and by reference to the accompanying drawings.

Advantageous Effect of the Invention

The present invention has the following advantages in that it is:

miniaturized, low in cost, amiable to automated manufacturing, and permits integrated micro-electromagnetic shutters to be manufactured using modern methods of mass integration, thereby substantially reducing assembly cost, and these shutters enable a high degree of miniaturization with improved reliability.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
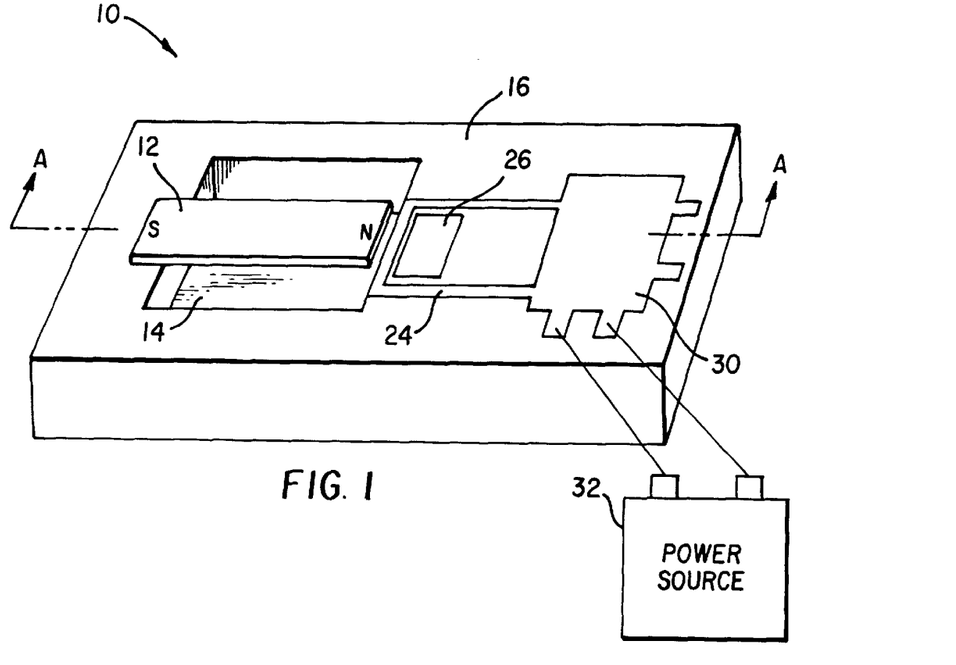
FIG. 1 is perspective representation of a preferred embodiment of the invention.
Figure 2:
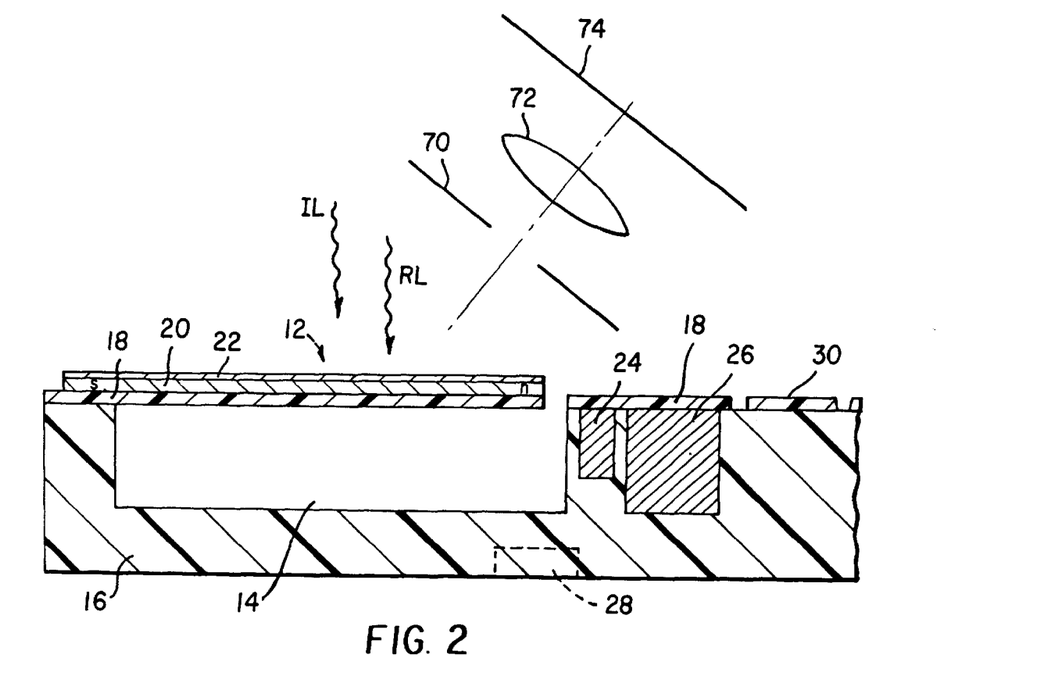
FIG. 2 is a section view of the preferred representation taken along the section line A—A in FIG. 1.

Referring to FIGS. 1 and 2, a perspective view of a reflector 10 is shown. Specifically, a cantilever 12 is supported above a cavity 14 formed in silicon substrate 16. The cantilever 12 comprises a silicon nitride base 18 (shown in FIG. 2) which is coated with a layer of hard magnetic material 20 that is polarized along its length and a reflective layer 22. A material such as AlNiCo or PtCo having a magnetic property and a highly reflective property may be substituted for 20 and 22. A current trace 24 is formed in the substrate 16. A soft magnetic material 26 is deposited in the substrate adjacent the trace 24. Optionally, a second soft magnetic material 28 is deposited in the substrate below the free end of the cantilever 12. Drive electronics 30 are formed in the substrate 16 to receive input data to which the cantilever is to respond by bending or not bending. Optionally, the drive electronics may be left off of the substrate 16 and positioned remote from the reflector 10. For maximum integration effect it is preferable to integrate the drive electronics 30 into the substrate 16. A power source 32 is connected to the reflector 10 to provide the power necessary to drive the cantilever 12 and the integrated drive electronics 30. Also shown in FIG. 2 are the incident light rays, IL, and an aperture 70 for eliminating the passage of stray light onto optics 72 which focuses reflected light, RL, onto a display screen 74 when the cantilever is activated as shown in FIG. 3.

Figure 3:
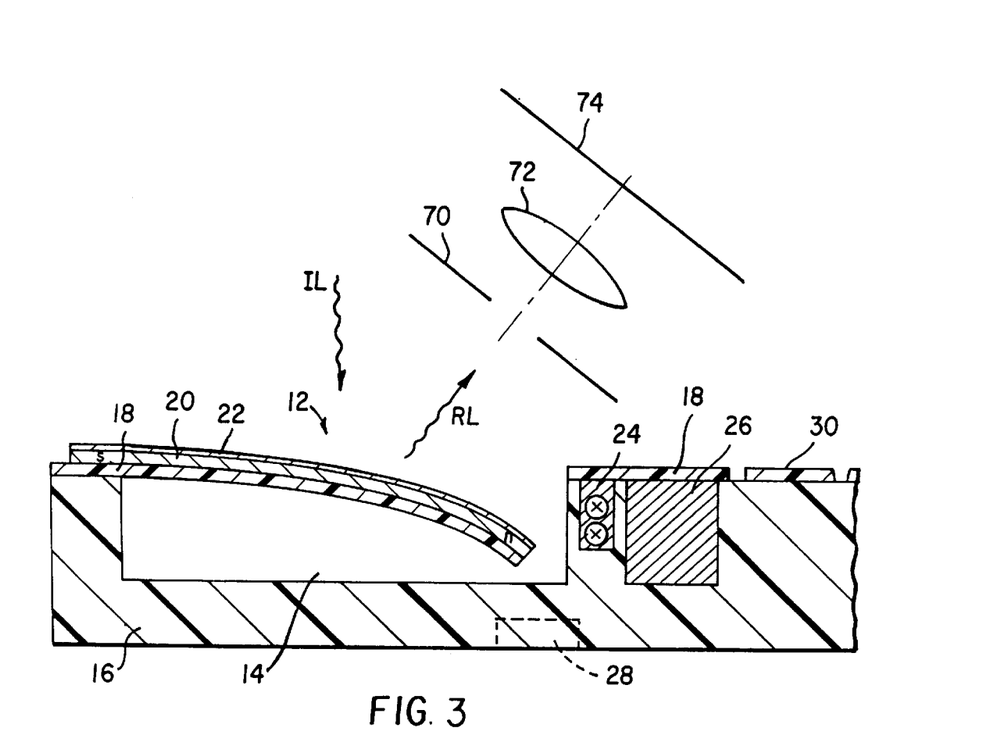
FIG. 3 is a section view illustrating a deflection of the light reflective element.

In operation, referring to FIGS. 2 and 3, the cantilever 12 overhangs the cavity 14 with its free end in proximity to the current trace 24. The soft magnetic material 26 residing behind the current trace 24 interacts with the magnetic field generated when current flows through the trace. For the purpose of illustration, the incident light, IL, is shown perpendicular to the undeflected cantilever 12. Notice that in the position shown in FIG. 2, no reflected light, RL, passes through the aperture 70 to optics 72. Specifically in FIG. 3, the cantilever 12 is shown deflected downward due to current being applied to the current trace 24 in the direction (into the paper) indicated by the arrow tails. More specifically, as current flows through the activation trace (into the paper), the north pole of the magnetic layer 20 of the cantilever 12 experiences a Lorentz force which acts to deflect the cantilever downwards as shown. The presence of the soft magnetic material 26 enhances the Lorentz force. In this position, the reflected light, RL, passes through the aperture 70, through the optics 72 onto the display screen 74. Thus one can control the light output to a given surface over a small spot (pixel) and this can be adapted to digital display and printing applications. It is instructive to note that soft magnetic material 26 is not essential to the operation of the reflector 10, but it enhances the performance of the reflector.

As previously mentioned, the optional soft magnetic material 28 may be placed as shown to interact with the end pole of the magnetic layer 20 on the cantilever 12 to provide a downward detent position for the bent cantilever 12 after the deflection current has been applied to the current trace 24. This detent arrangement minimizes the energy needed to hold the cantilever 12 in the downward deflected position.

Figures 4A, 4B:
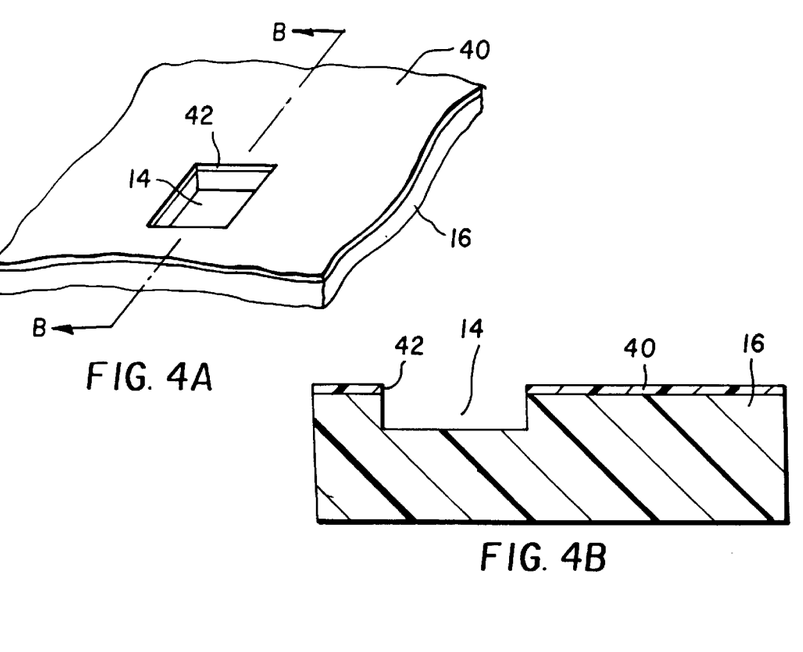
FIGS. 4A and 4B illustrate in perspective view the structure resulting from a first fabrication step and a section view of the resultant structure taken along the section lines B—B, respectively.

Referring to FIGS. 4A and 4B, an etch mask 40 such as photoresist is applied to a silicon substrate 16 and patterned using conventional photolithographic techniques to create a window 42. A cavity 14 is then formed in the silicon substrate 16 by a dry etching technique such as high density plasma etching. The etch mask 40 is subsequently removed.

Figure 5A:
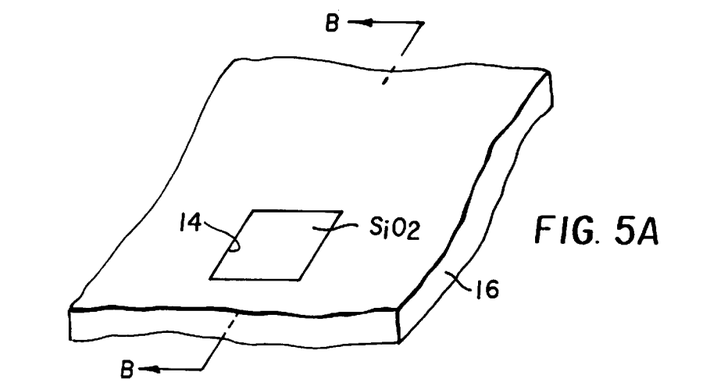
FIGS. 5A and 5B illustrate in perspective view the structure resulting from a second fabrication step and a section view of the resultant structure taken along the section lines B—B, respectively.
Figure 5B:
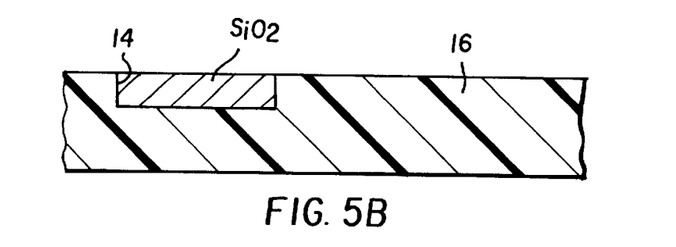

Referring to FIGS. 5A and 5B, the cavity 14 is refilled with a sacrificial material, for example, low density PECVD $SiO_2$. The substrate 16 is planarized by chemical mechanical polishing.

Figure 6A:
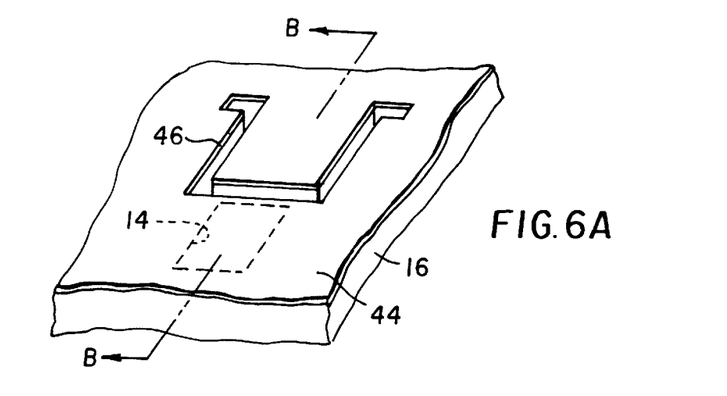
FIGS. 6A and 6B illustrate in perspective view the structure resulting from a third fabrication step and a section view of the resultant structure taken along the section lines B—B, respectively.
Figure 6B:
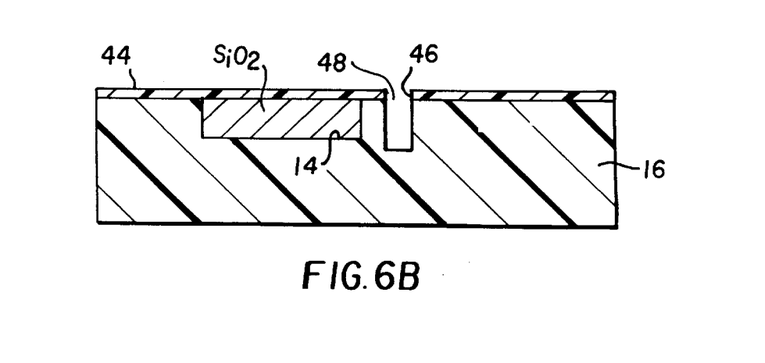

Referring to FIGS. 6A and 6B, an etch mask 44 such as a photoresist is applied to the substrate 16 and patterned using conventional photolithographic techniques to create a window 46 shaped like trace 24. A trench 48 is then etched in the substrate 16 by a dry etching technique such as high density plasma etching. The etch mask 44 is subsequently removed.

Figure 7A:
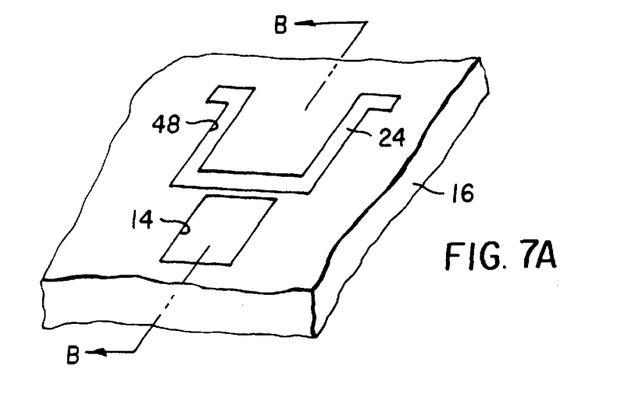
FIGS. 7A and 7B illustrate in perspective view the structure resulting from a fourth fabrication step and a section view of the resultant structure taken along the section lines B—B, respectively.
Figure 7B:
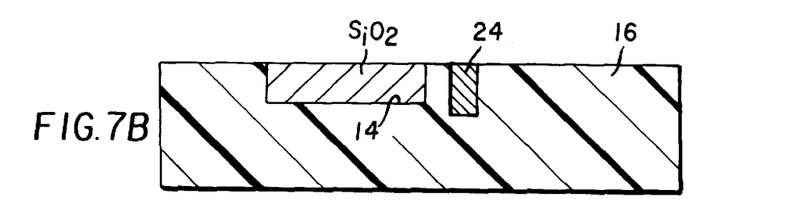

Referring to FIGS. 7A and 7B, the trench 48 is refilled with a conductive material such as copper and planarized. Optionally, an insulating material may be applied to the trench bottom and sidewalls to prevent electrical conduction from the current trace 24 to the silicon substrate 16.

Figure 8A:
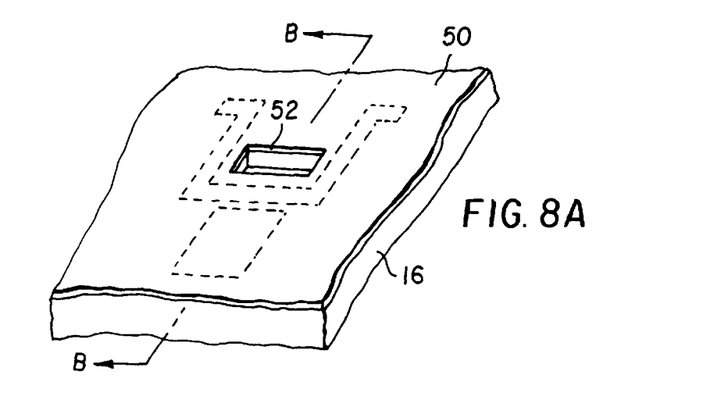
FIGS. 8A and 8B illustrate in perspective view the structure resulting from a fifth fabrication step and a section view of the resultant structure taken along the section lines B—B, respectively.
Figure 8B:
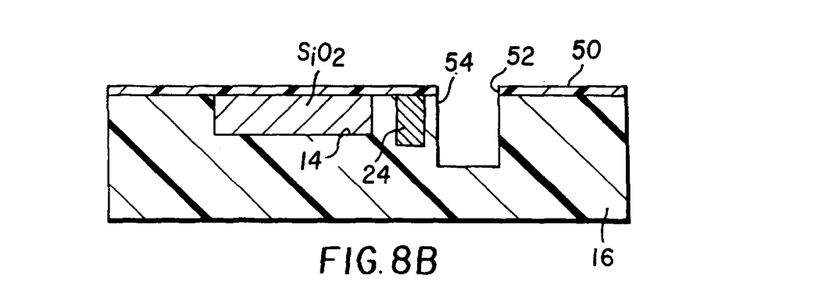

Referring to FIGS. 8A and 8B, an etch mask 50 such as photoresist is applied to the silicon substrate 16 and patterned using conventional photolithographic techniques to create a window 52 in the shape of the soft magnetic material 26. A second trench 54 is etched in the silicon substrate 16 by a dry etching technique such as high density plasma etching. The etch mask 50 is subsequently removed.

Figure 9A:
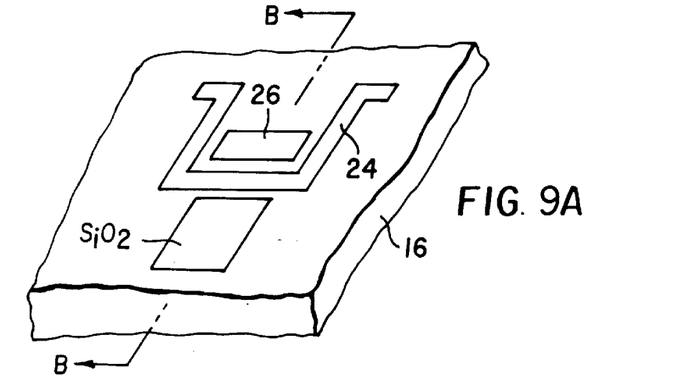
FIGS. 9A and 9B illustrate in perspective view the structure resulting from a sixth fabrication step and a section view of the resultant structure taken along the section lines B—B, respectively.
Figure 9B:
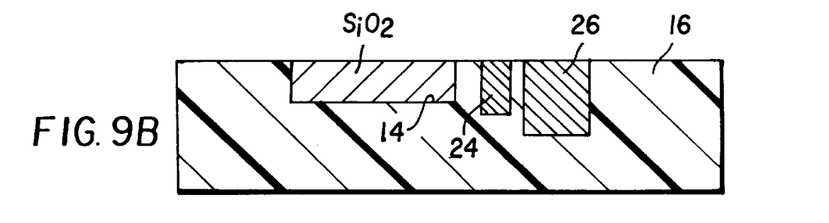

Referring to FIGS. 9A and 9B, the second trench 54 is refilled with a soft magnetic material such as permalloy and planarized.

Figure 10A:
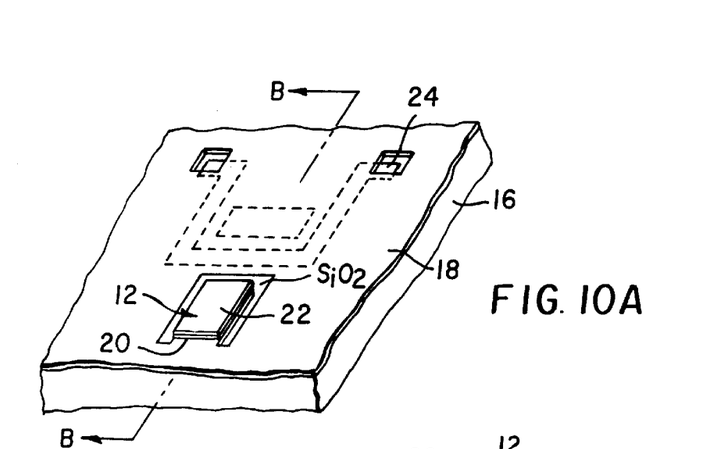
FIGS. 10A and 10B illustrate in perspective view the structure resulting from a seventh fabrication step and a section view of the resultant structure taken along the section lines B—B, respectively.
Figure 10B:
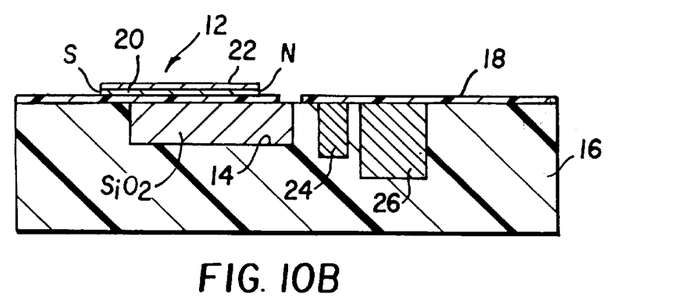

Referring to FIGS. 10A and 10B, a layer of membrane material 18 such as $SiN_x$ is applied to the silicon substrate 16. Standard photolithographic and thin film etching techniques are used to pattern openings in the $SiN_x$ so as to create contact openings for the current trace 24 and a partial opening above the $SiO_2$-filled cavity. A layer of hard magnetic material 20 is then formed and poled on top of the SiNx above the cavity. Next, the reflective layer 22 may be formed on top of the layer of hard magnetic material 20.

The hard magnetic material 20 is preferably made from cobalt-platinum (CoPt) which is deposited for in-plane polarization at room temperature using dc or rf magnetron sputtering as described in the publication entitled "Structure and Micromagnetic Predictions for Hysteretic Phenomena in a Novel Co-Pt Permanent Magnet Thin Film," by R. H. Victora, et al. in the JOURNAL OF MAGNET AND MAGNETIC MATERIALS, Vol. 97, 1991, pp. 343–352. The magnetic material 20 is polarized along the length of cantilever 12, and overcoated with a highly reflective layer 22 comprised of gold, silver, aluminum, or alloys thereof.

Figures 11A, 11B:
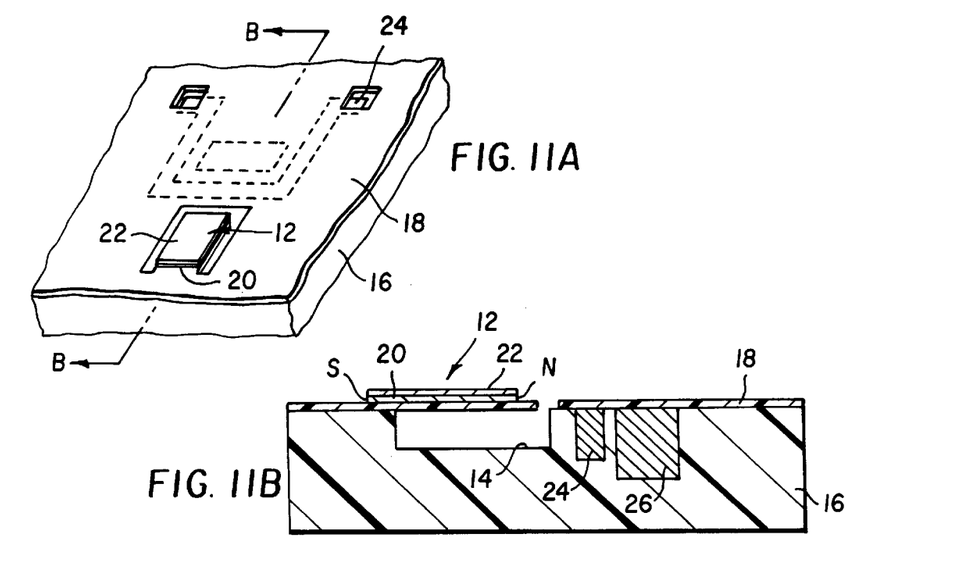
FIGS. 11A and 11B illustrate in perspective view the structure resulting from an eighth fabrication step and a section view of the resultant structure taken along the section lines B—B, respectively.

Referring to FIGS. 11A and 11B, the $SiO_2$ is removed by a preferential etchant such as hydrofluoric acid to etch out the $SiO_2$ located in the cavity 14 below the cantilever 12 to complete the reflector 10.

Figure 12:
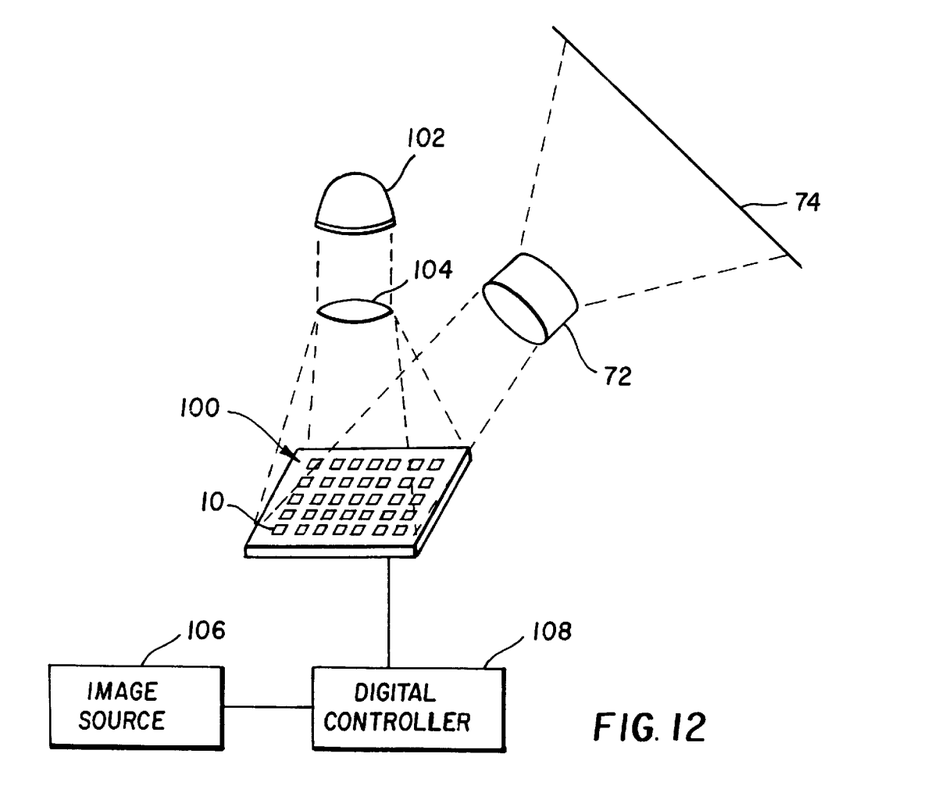
FIG. 12 illustrates in perspective view a system incorporating an array of light deflectors.

Referring now to FIG. 12, an array 100 of reflectors 10 is exposed to $I_L$ from a light source 102 via optics 104. The incident light is reflected off of the reflective surface of each of the reflectors 10. An image (data) source 106 provides digital information to a digital controller 108. The digital controller 108 has outputs corresponding in number to the number of reflectors 10. Each output is connected to provide a current to the current trace 24 of a respective reflector 10 so as to cause a respective cantilever 12 to either deflect or not according to the image to be formed. A deflection of a cantilever will cause a ray of reflective light RL to be directed to a display screen 74 via optics 72 thus forming a replica of the image from the image source 106 onto the display 74.

The present invention has been described with reference to preferred embodiments. However, it will be appreciated that variations and modifications can be effected by a person of ordinary skill in the art without departing from the scope of the invention.

PARTS LIST 10 reflector
12 cantilever
14 cavity
16 silicon substrate
18 layer of membrane material 20 layer of hard magnetic material
22 reflective layer
24 current trace
26 soft magnetic material
28 soft magnetic material
30 drive electronics
32 power source
40 etch mask
42 window
44 etch mask
46 window
48 trench
50 etch mask
52 window
54 second trench
70 aperture
72 optics
74 display screen
100 array
102 light source
104 optics
106 image source
108 digital controller

What is claimed is:

1. A method for fabricating a radiation reflector comprising the steps of:

a) forming an etch mask on a silicon substrate to create a first window;

b) etching a cavity into the substrate at the site of the first window;

c) removing the etch mask;

d) filling the cavity with a sacrificial material;

e) planarizing the silicon substrate;

f) forming a second etch mask on the silicon substrate to create a window shaped as a current trace;

g) etching a first trench into the substrate at the site of the second window;

h) removing the second etch mask;

i) filling the trench with electrically conductive material;

j) planarizing the silicon substrate;

k) forming a third etch mask on the substrate to create a third window;

l) etching a second trench into the substrate at the site of the third window;

m) removing the third etch mask;

n) filling the second trench with a soft magnetic material;

o) applying a layer of membrane material to the silicon substrate;

p) forming openings in the layer of membrane material to form contact openings to the current trace, and a partial opening above the cavity with the sacrificial material;

q) forming and poling a thin film magnet in the partial opening above the cavity;

r) forming a reflective coating on the thin film magnent; and s) etching out the sacrificial material from the cavity to complete the fabrication of the radiation reflector.

2. The method for fabricating a radiation reflector according to the steps of claim 1 and further comprising the step of:

forming drive electronics on said silicon substrate for providing a driving current to the current trace.

3. The method for fabricating a radiation reflector according to the steps of claim 1 wherein the sacrificial material is low density PECVD $SiO_2$.

4. The method for fabricating a radiation reflector according to the steps of claim 1 wherein the membrane material is $SiN_x$.

5. The method for fabricating a radiation reflector according to the steps of claim 1 wherein the thin film magnet is comprised of a composition of cobalt-platinum CoPt.

6. The method for fabricating a radiation reflector according to the steps of claim 1 wherein the reflective coating is comprised of gold, silver, aluminum, or alloys thereof.

* * * * *

UNITED STATES PATENT AND TRADEMARK OFFICE
CERTIFICATE OF CORRECTION

PATENT NO. : 6,071,752
DATED : June 6, 2000
INVENTOR(S) : Edward P. Furlani, et al.

Page 1 of 1

It is certified that error appears in the above-identified patent and that said Letters Patent is hereby corrected as shown below:

<u>Column 6, Paragraph "q" first line:</u>
Delete "poling" and insert -- polarizing --.
Delete "in" and insert -- on the portion of the membrane material which is partially surrounded by --.

Signed and Sealed this

Twenty-fourth Day of July, 2001

*Attest:*

NICHOLAS P. GODICI
*Attesting Officer*   *Acting Director of the United States Patent and Trademark Office*